(12) United States Patent
Hager et al.

(10) Patent No.: US 8,406,591 B2
(45) Date of Patent: Mar. 26, 2013

(54) LOW COST, HIGH PERFORMANCE, LOW PROFILE FLEXIBLE REINFORCEMENT FOR COMMUNICATIONS CABLE

(75) Inventors: Thomas P. Hager, Westerville, OH (US); Richard N. Lehman, Newark, OH (US); James R. Priest, Nashport, OH (US)

(73) Assignee: Neptco JV, LLC, Pawtucket, RI (US)

( * ) Notice: Subject to any disclaimer, the term of this patent is extended or adjusted under 35 U.S.C. 154(b) by 0 days.

(21) Appl. No.: 13/406,078

(22) Filed: Feb. 27, 2012

(65) Prior Publication Data

US 2013/0034659 A1 Feb. 7, 2013

Related U.S. Application Data

(60) Division of application No. 12/151,004, filed on May 1, 2008, now Pat. No. 8,126,303, which is a continuation of application No. 10/404,196, filed on Mar. 31, 2003, now abandoned, which is a continuation-in-part of application No. 10/246,007, filed on Sep. 18, 2002, now abandoned.

(51) Int. Cl.
  *G02B 6/44* (2006.01)
  *G02B 6/00* (2006.01)
  *H01B 7/00* (2006.01)
  *G11B 11/105* (2006.01)
  *B05D 5/06* (2006.01)

(52) U.S. Cl. ........ 385/114; 385/100; 385/102; 385/107; 385/109; 385/111; 385/113; 385/141; 385/143; 385/145; 174/116; 174/113 R; 174/119 C; 427/162; 427/163.2; 264/1.24; 264/1.25; 264/1.28; 264/1.29; 264/1.6; 264/1.7

(58) Field of Classification Search .......... 385/100, 385/102, 104, 107, 109, 111, 113, 141, 143, 385/145, 114; 174/24, 25 R, 68.1, 251, 259, 174/70 R, 76, 121 R, 121 SR, 120 C, 110 PM, 174/116, 113 R, 110 R, 107, 119 C, 36; 428/321, 428/332, 391; 427/162, 163.2, 209; 264/1.24, 264/1.25, 1.28, 1.29, 1.6, 1.7

See application file for complete search history.

(56) References Cited

U.S. PATENT DOCUMENTS

| | | | |
|---|---|---|---|
| 2,723,215 A | 11/1955 | Biefeld et al. | |
| 3,765,927 A | 10/1973 | Marzocchi | 117/72 |
| 4,381,420 A * | 4/1983 | Elliott et al. | 174/34 |
| 4,636,437 A | 1/1987 | Algrim et al. | 428/391 |
| 4,659,753 A | 4/1987 | Tiburtius et al. | |

(Continued)

FOREIGN PATENT DOCUMENTS

| | | |
|---|---|---|
| DE | 100 16 536 A1 | 10/2001 |
| EP | 0 291 023 | 11/1988 |

(Continued)

OTHER PUBLICATIONS

Abstract in English of JP 01022982A, Derwent Acc-No: 1989-071749, 3 pages.

(Continued)

*Primary Examiner* — Brian Healy
(74) *Attorney, Agent, or Firm* — Mintz, Levin, Cohn, Ferris, Glovsky and Popeo, P.C.

(57) ABSTRACT

A low cost, high performance, low profile flexible reinforcement member that can be used for both optical and copper communications cable. The reinforcement members made according to the preferred process are more rigid than known reinforcement members, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques.

15 Claims, 5 Drawing Sheets

U.S. PATENT DOCUMENTS

| | | | |
|---|---|---|---|
| 4,781,432 A | 11/1988 | Zongor et al. | |
| 4,837,077 A | 6/1989 | Anton et al. | 428/240 |
| 4,874,219 A | 10/1989 | Arroyo et al. | 350/96.23 |
| 4,921,558 A | 5/1990 | Johnson et al. | 156/181 |
| 5,182,784 A | 1/1993 | Hager et al. | 385/128 |
| 5,267,338 A * | 11/1993 | Bullock et al. | 385/100 |
| 5,286,562 A | 2/1994 | Girgis | 428/391 |
| 5,512,625 A | 4/1996 | Butterbach et al. | 524/490 |
| 5,736,220 A | 4/1998 | Tingley | 428/114 |
| 5,925,461 A | 7/1999 | Fairgrieve | |
| 6,004,676 A | 12/1999 | Girgis | |
| 6,080,489 A | 6/2000 | Mehta | |
| 6,195,486 B1 | 2/2001 | Field et al. | 385/100 |
| 6,238,791 B1 | 5/2001 | Schell et al. | 428/392 |
| 6,380,298 B2 | 4/2002 | Flautt et al. | 524/500 |
| 6,572,719 B2 | 6/2003 | Fecko et al. | |
| 6,677,394 B1 | 1/2004 | Butterbach et al. | |
| 6,746,762 B1 | 6/2004 | Hosoda et al. | 428/332 |
| 6,813,422 B1 * | 11/2004 | Krishnamurthy et al. | 385/109 |
| 7,180,000 B2 | 2/2007 | Hager et al. | |
| 8,126,303 B2 * | 2/2012 | Hager et al. | 385/100 |
| 2003/0044139 A1 | 3/2003 | Norris et al. | 385/113 |
| 2004/0050581 A1 * | 3/2004 | Hager et al. | 174/116 |
| 2006/0127645 A1 * | 6/2006 | Imamura et al. | 428/170 |
| 2008/0310801 A1 * | 12/2008 | Hager et al. | 385/102 |

FOREIGN PATENT DOCUMENTS

| | | |
|---|---|---|
| EP | 0 685 855 | 12/1995 |
| EP | 1 076 253 | 2/2001 |
| GB | 1 485 253 | 9/1977 |
| JP | 62053309 A | 3/1987 |
| JP | 64-22982 | 1/1989 |
| WO | 9115434 A1 | 10/1991 |
| WO | 9623024 A1 | 8/1996 |
| WO | WO-9959166 A2 | 11/1999 |

OTHER PUBLICATIONS

International Search Report for PCT/US2004/009772, mailed Nov. 3, 2004.

H.-H. Shih and G.R. Hamed—"Peel Adhesion and Viscoelasticity of Poly (ethylene-co-vinyl acetate)-Based Hot Melt Adhisvies. I. The Effect of Tackifier Compatibility"—Journal of Applied Polymer Science, John Wyley and Sons Inc., New York, vol. 63, No. 3, Jan. 18, 1997, pp. 323-331.

* cited by examiner

LOW COST, HIGH PERFORMANCE, LOW PROFILE FLEXIBLE REINFORCEMENT FOR COMMUNICATIONS CABLE

CROSS-REFERENCE TO RELATED APPLICATIONS

This application is a division of U.S. patent application Ser. No. 12/151,004, filed May 1, 2008, which is a continuation of U.S. patent application Ser. No. 10/404,196, filed Mar. 31, 2003, now abandoned, which is a continuation-in-part of U.S. patent application Ser. No. 10/246,007, filed Sep. 18, 2002, now abandoned, the contents of each incorporated herein in their entirety by reference.

Technical Field And Industrial Applicability of the Invention

The present invention relates generally to reinforced communication cables and more specifically to low cost, high performance, low profile, flexible reinforcement for communications cables.

BACKGROUND OF THE INVENTION

The market for telecommunications cable and related products is in an over capacity state. The large number of suppliers of these products has put tremendous pressure on the industry to provide communications cable with increased performance at lower costs.

Optical communications cables consist essentially of a plurality of randomly placed optical communication fibers, typically in ribbon form, contained within a polymer jacket. Of course, other types of communications cables can have single optical fibers, bundled optical fibers, or tight-buffered optical fibers. The fibers are typically tight or loose buffered within a polymer tube contained within a portion of the jacket. One or more low profile flexible reinforcement members and stiff strength members may also be contained within a portion of the polymer jacket outside of the central tube or buffer tubes to provide support and prevent kinking of the communication fibers. These reinforcement members are applied by being wrapped helically around the inner core prior to outer jacketing (as in optical loose tube cable types) or are directly extruded into the jacket matrix (as in twisted copper telephone cable).

The low profile flexible reinforcements for cables are made in a wide variety of methods. Typically, these reinforcements are manufactured by first applying a binder and sizing containing a film former and oils or coupling agents to a glass strand and then applying a relatively heavy layer of a water-based, high molecular weight polymer latex or wax. The coated strands may then be introduced to the communications cables by known methods.

These coatings may impart many important properties to the low profile flexible reinforcements both during manufacture and after introduction to the cable. For example, these coatings prevent abrasion of the glass fibers during the combination with the reinforcement and during deployment. Also, these coatings prevent adhesion of the reinforcing fibers to the polymer jacket. These coatings may also impart adhesion if desired to the polymer jacket, for example, as is the case with polyvinyl chloride (PVC) jacketed communications cables. Additionally, these coatings can be super absorbent and can thus prevent water seepage from damaging the optical fibers.

One problem with presently available reinforcements is that they are relatively expensive to manufacture. For example, a relatively heavy layer of high molecular weight polymer latex or wax must be applied to the fibers in order to impart the mechanical properties necessary for optical and copper telecommunications cables. Also, these high molecular weight polymers have extremely high melt viscosities. Further, air can be trapped within the interstices of the fibers themselves after the introduction of the high molecular weight polymers, which can lead to premature degradation of the fibers and strand deficiencies. Also, because water-based high molecular weight coatings are typically used, a high-energy water-removal step is required before the fiber reinforcements can be introduced into the cabling. These water-based coatings, typically in emulsion form, are expensive as well.

SUMMARY OF THE INVENTION

A low cost, high performance, low profile flexible reinforcement member is provided that can be used for both optical and copper communications cables. The reinforcement members made according to the preferred process are more rigid than glass reinforcement members made according to the prior art as described above, but are less rigid than glass pultruded rods as described in U.S. Pat. No. 4,781,432 to Zongor et al. Communications cables utilizing these members are lightweight and exhibit an improved combination of strength and flexibility compared to traditional communications cables. Further, these communication cables may then be installed into underground ducts using more economical and faster installation techniques such as blowing-in installation.

The member is made by first melting and then applying a low molecular weight, low melt viscosity thermoplastic material, such as modified or unmodified polyethylene or wax, to fiber material.

This wax material is air cooled prior to the introduction of a second layer of nonwater-based high molecular weight ("MW") polymer, such as ethylene acrylic acid (EAA), that is applied to the strand in an extruder or similar device. The high molecular weight polymer surrounds the strands, but does not penetrate. The high MW polymer is tough, but flexible, and gives the strand, mechanical properties for use in cable systems. The overall amount of high MW polymer applied to the strand is less than is present in cables of the prior art.

A high MW polymer topcoat is applied via a die box having at least one slotted, tapered die to remove excess topcoat from the coated strand. After the strand passes through the slotted, tapered die, it maintains a flat configuration. The flat reinforcement member has several advantages when installed in a cable. It can cover significantly more of the outer cable core thereby providing enhanced reinforcement properties, i.e., preventing adhesion of the underlying optical fibers, buffer tubes containing optical fiber, or other cable core components to the polymer jacket. The flat reinforcement member also reduces the overall cable diameter which, in turn, reduces the amount of jacketing compound required to coat the exterior of the cable.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
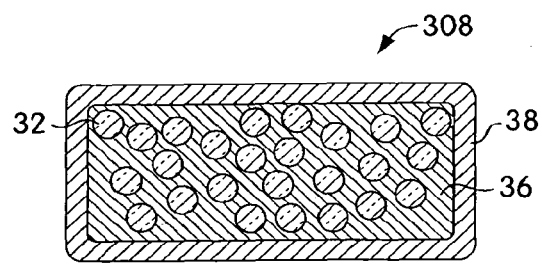
FIG. 1 is a cross-sectional view of a low profile flexible reinforcement member according to a preferred embodiment of the present invention.
Figure 2:
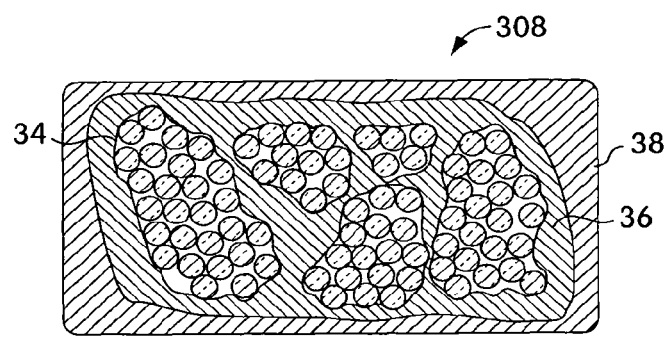
FIG. 2 is a cross-sectional view of a low profile flexible reinforcement member according to a preferred embodiment of the present invention.
Figure 3:
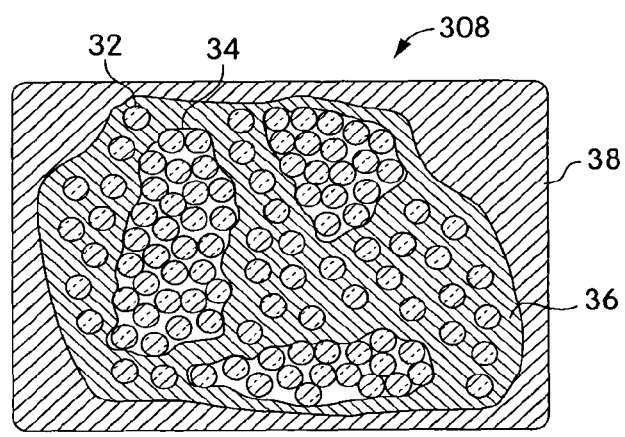
FIG. 3 is a cross-sectional view of a low profile flexible reinforcement member according to a preferred embodiment of the present invention.

The present invention relates to a new low profile flexible reinforcement member that may be used in telecommunication cables such as optical cables or copper cables. FIGS. 1-3 below illustrate three preferred embodiments of the low profile flexible reinforcement member.

FIG. 1 illustrates a cross-sectional view of the low profile flexible reinforcement member 308 according to a preferred embodiment of the present invention. The member 308 is comprised of a strand having a plurality of single filaments 32 of glass fibers saturated with a primary saturant 36 and coated with a higher molecular weight polymer topcoat 38.

Referring now to FIG. 2, another preferred embodiment shows the member 308 having a plurality of strand bundles 34 replacing the individual filaments 32. Also, FIG. 3 depicts the member 308 as having a combination of both filaments 32 and bundles 34. Again, in both FIGS. 2 and 3, the fibers that comprise the filaments 32 and/or bundles 34 are saturated with the primary saturant 36 and coated with the topcoat 38.

The filaments 32 and bundles 34 that may be used include E-type glass fibers or ECR-type glass fibers such as Advantex® type glass fibers, both available from Owens Corning. Additionally, other fibrous materials can be used such as: Dupont de Nemours Kevlar® aramid or Teijin Twaron® aramid; Toyobo Zylon® poly(p-phenylene-2,6-benzobisoxazole)(PBO); carbon fibers such as Hercules polyacrylonitrile Magnamite carbon fibers; high silica glass such as S-2 Glass®, Zentron®, Vetron® or other high strength glass from Advanced Glass Yarns (Aiken, S.C.) or other glass manufacturers; high tenacity, linear, high molecular weight polyethylene Spectra® fiber from Honeywell Performance Fibers (Colonial Heights, Va.); or other high modulus reinforcements. The term "high modulus" is defined as the modulus of elasticity, also known as Young's Modulus, which is a coefficient of elasticity representing the ratio of stress to strain as a material is deformed under dynamic load. It is the measure of softness or stiffness of a material. In the case of "high modulus" reinforcements, the values for the stress to strain ratio will typically exceed 30 GPa. For the above examples, the typical elastic modulus of each are as follows: E-Glass=72 GPa; aramid=124 GPa (depending on aramid type); PBO=280 GPa; carbon fibers=228 GPa; S-2 Glass® fiber=90 GPa; linearized polyethylene fiber=113 GPa.

The fiber material can be a glass strand or bundle, or combination of strand and bundle that penetrates the interstices within and between the fibers. These glass fibers are preferably sized with one of Owens Corning's sizing compositions prior to introduction within the member 308. Preferably Owens corning sizing 158B, 111A or 366 is used; however, other epoxy/silane, vinylester, polyester, or starch/oil type sizings available from many manufacturers may also be used. The filaments 32 are preferably filamentized strands and are approximately 11-26 microns in diameter. The bundles 34 preferably comprise filaments of approximately 13 microns in diameter, with approximately 1000-2000 filaments per bundle 34 and have a linear density of approximately 200-4800 grams/kilometer.

The saturant 36 fills in the interstices between the strands 32 and/or bundles 34 and comprises about 0.1-35 percent, and more preferably about 15 percent, of the total weight of the member 308. The saturant 36 also fills the voids within the filaments 32 and/or bundles 34 caused by abrasions and or defects in the manufacturing process. In this way, the saturant 36 functions to lower the amount of air that is typically trapped between the filaments 32 and bundles. The saturant also lowers the amount of air that may be trapped within the bundles 34. The saturant 36 also prevents filament 32 deficiencies such as fiber-fiber abrasion, water penetration, and can increase the strength of the filaments 32. In these ways, the saturant 36 increases the strength of the member 308.

Preferably, the saturant 36 comprises a low molecular weight mineral wax having melting points under approximately 300 degrees Celsius, preferably less than 150 degrees Celsius and most preferably between about 100 and about 120 degrees Celsius and melt viscosities of less than approximately 1000 centipoise (cps); preferably less than 500 centipoise, that allow easy saturation into the fiber strands 32 or bundle 34. One preferable mineral wax is a microcrystalline wax such as Witco Chemical's Multiwax, which has a melting point of approximately 70-80 degrees Celsius (160-170 degrees Fahrenheit) and a melt viscosity of approximately 50-100 cps. Other examples of mineral waxes that may also be used include polyalphaolefin waxes, such as Baker Petrolite Vybar 260, and polyethylene waxes, such as Baker Petrolite Polywax 100. Additionally, modified polyethylenes and polypropylenes may also be used, such as Eastman Chemicals Epolene E-15 and E-43 oxidized polyethylene or Epolene G-3015 maleated polypropylene.

The high molecular weight polymer topcoat 38 surrounds the saturant 36, but does not penetrate within the saturant 36 to the filaments 32 and bundle 34. The topcoat 38 comprises approximately 0.1-35 percent, preferably between about 5 and about 20 percent and more preferably between about 10 and about 15 percent, of the total weight of the member 308. The topcoat 38 is tough, but flexible, and gives the member 308 its mechanical properties. The topcoat 38 is a higher modulus coating that changes the characteristics of the member 308. The topcoat 28 offers polyethylene adhesion and stiffens the member 308. Table 1 shows the polyethylene adhesion of individual glass strands according to ASTM D1871, Test Method #53. If water swellable topcoats are used, the member 308 could provide additional water protection capabilities.

TABLE 1

Polyethylene Adhesion
Individual Strand Pull-Outs (lbf/0.5 in)

|  | Wax Only | Wax + EAA Topcoat | DHM 712 Only | DHM 712 + EAA Topcoat | DHM 712/EAA 70:30 Blend |
|---|---|---|---|---|---|
| 1 | 21.9 | 54.9 | 24.7 | 58.9 | 65.5 |
| 2 | 31.5 | 56.0 | 32.3 | 60.5 | 19.1 |
| 3 | 33.1 | 70.5 | 41.3 | 51.5 | 62.3 |
| 4 | 32.5 | 63.1 | 52.8 | 50.9 | 53.1 |
| 5 | 38.8 | 64.6 | 40.3 | 70.1 | 13.7 |
| 6 | 27.1 | 55.8 | 39.1 | 48.4 | 85.6 |
| 7 | 28.1 | 74.1 | 49.3 | 48.2 | 32.9 |
| 8 | 14.4 | 61.1 | 21.4 | 68.6 | 40.9 |
| 9 | 29.3 | 91.5 | 32.5 | 66.1 | 41.5 |
| 10 | 18.1 | 68.1 | 37.4 | 61.0 | 70.8 |
| 11 | 27.7 | 46.6 | 43.1 | 61.3 | 70.5 |
| 12 | 26.9 | 68.3 | 32.9 | 68.2 | 28.7 |
| 13 | 22.5 | 68.6 | 39.5 | 61.8 | 75.0 |
| 14 | 26.6 | 64.5 | 31.8 | 57.2 | 74.8 |
| Average | 27.0 | 64.8 | 37.0 | 59.5 | 52.5 |
| Std. Dev. | 6.3 | 10.6 | 8.6 | 7.4 | 23.0 |
| C.I. | 4 | 7 | 6 | 5 | 16 |
| Upper | 31 | 72 | 43 | 65 | 68 |
| Lower | 23 | 58 | 31 | 54 | 37 |

Test was strand pull out from polyethylene plaques. Raw data recorded in pounds of force per 0.5 inch imbedded strand.
Polyethylene was cable-jacketing grade, black compounded.
Pulls done at room temperature.
Test method used: ASTM D1871 Adhesion of Glass to PVC; Test Method #53.

One preferred topcoat 38 is an ethylene acrylic acid (EAA) polymer such as Dow Chemical's Primacor 5986 or 5990I ethylene acrylic acid resin, which is useful if adhesion to a polyethylene jacket is required. Other polymers that may comprise the topcoat 38 include polyethylene (PE) or polypropylene (PP) polymers, or copolymers of PE and PP, available from manufacturers such as Dow Chemical, Shell, and Basell. Still further preferable topcoats 38 include ethylene vinyl acetate (EVA) copolymers, styrene-butadiene-styrene (SBS), polybutadiene terephthlate polyether glycol (PBT-PEG), polyamide or many other polyolefins and thermoplastic elastomers available from manufacturers such as Henkel, GLS and E. I. Du Pont de Nemours. Of course, as one skilled in the art would appreciate, the ultimate choice of topcoats 38 is dependent upon the end use of the communications cable having the reinforcement member 308.

Figure 4:
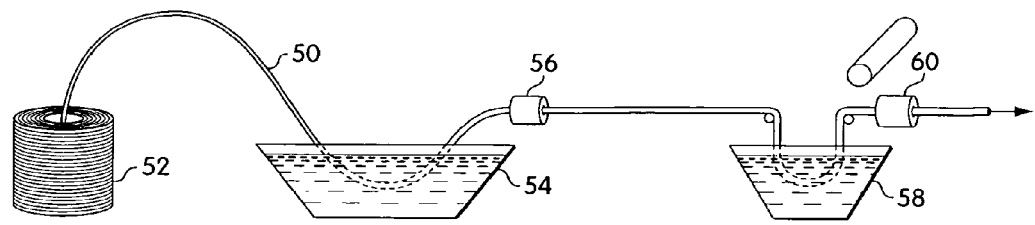
FIG. 4 illustrates an assembly line used for making the low profile flexible reinforcement member according to FIG. 1-3.

FIG. 4 illustrates the process for making the members 308 of FIGS. 1-3. The process begins by unrolling the fibers 50 from a reel 52. The fibers 50 represent filaments 32, bundles 34, or a combination of filaments 32 and bundles as depicted in FIGS. 1-3. The fibers 50 are introduced to an application device 54, here a heated immersion bath 54 that holds the saturant 36. The bath 54 is maintained between approximately 90-100 degrees Celsius (200-210 degrees Fahrenheit) such that the primary saturant 36 has a viscosity of approximately 50-100 cps.

The coated fibers 50 exit the bath 54 and are introduced to a stripper die 56 to strip back the excess saturant 36 and to help impregnate the fibers 50. The coated fibers 56 are then introduced to an applicator 58 containing the topcoat 38. One suitable applicator is a Nordson hot melt applicator coupled to a Nordson extruder. The topcoat 38 enters the applicator 58 through an orifice (not shown) For Dow Primacor 5990I, which has a melt point index of 1300 grams per 10 minutes, the material is heated to approximately 125 degrees Celsius (257 degrees Fahrenheit) as it enters the extruder 62 and applied to the fibers 50. The fibers 50 exit the applicator 58 and enter a second stripper die 60 having inner dimensions of 2.20 mm$^2$×0.50 mm$^2$ and an area of 1.10 mm$^2$ to form the low profile shape. The second stripper die 60 removes excess topcoat 38 and smoothes the outer surface of the topcoat 38. The topcoat is then cooled to form the low profile reinforcement member 308.

In an alternative embodiment, an extruder 62 using a crosshead die or similar applicator apparatus may be topcoat 38 to the coated fibers 50.

Various applicators 58 and extruders 62 are available from suppliers such as Nordson and selection of such apparatus based upon throughput and required temperature would be well understood by one of ordinary skill in the art.

Figure 8:
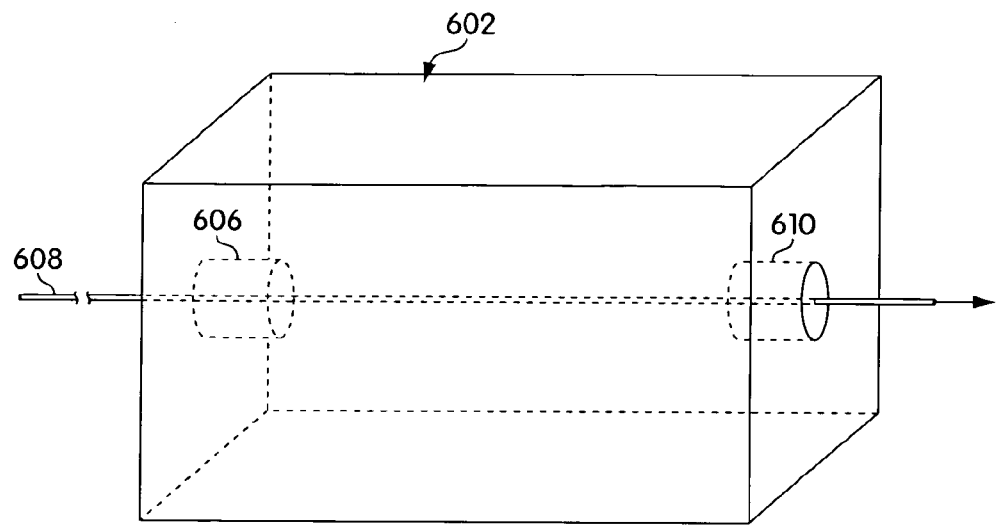
FIG. 8 illustrates the die box used for making the low profile flexible reinforcement member according to FIGS. 1-3.

FIG. 8 illustrates an alternative embodiment illustrating die box 602 which is used with an extruder 626 or other hot melt delivery device to introduce topcoat to the coated fibers 608. Fibers 608 enter the die box 602 through entrance die 606 after passing through stripper die 56, as discussed above (see FIG. 4).

In the alternative, entrance die 606 may not be used and the coated fibers 608 pass through an opening (not shown) in the die box 602 where topcoat is applied. Fibers 608 then pass through exit die 610 which removes excess topcoat, smoothes the outer surface of the topcoat. The topcoat is then cooled to form the reinforcement member 308.

Although standard dies may be used with the die box it is preferable to use a slotted, tapered, die.

Figure 9:
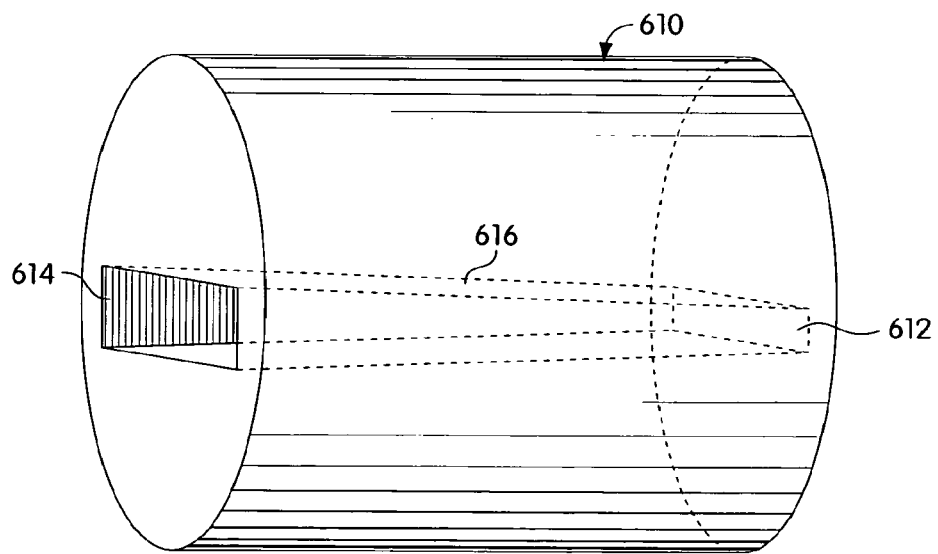
FIG. 9 illustrates the flat tapered die used for making the low profile flexible reinforcement member according to FIGS. 1-3.

FIG. 9 illustrates slotted, tapered die 610, which is used to guide the coated fibers 608 through the die box (as shown in FIG. 8) as topcoat is applied. As shown in FIG. 9, die 610 has a passageway 616 having an entrance 614 and exit 612 through which the coated fiber (not shown) passes. Typically the entrance 614 and exit 612 are "cupped" (not shown) to provide a smooth surface for the fiber to pass over as it enters and exits the die. The passageway 616 is tapered on all sides from the entrance 614 to the exit 612. Preferably, the degree of taper is from about 4% to about 6%. The die 610 has inner dimensions of 2.20 mm$^2$×0.50 mm$^2$ and an area of 1.15 mm$^2$ to form the low profile shape. As the coated fiber moves through the die 610 excess topcoat is removed. Passing the coated fibers over the tapered die forces the topcoat to intimately bond with the strand and gradually transitions the strand and topcoat to conform to a predominately flat configuration.

As shown in FIG. 9, entrance 614 of the die 610 has larger dimensions than exit 612. Further, the dimensions of the entrance and exits of the entrance die 606 are greater than the dimensions of the entrance and exits of the exit die 604 (FIG. 8). The variance in dimensions serves to guide the coated fibers through the die box 602. Die 610 "pre-shapes" or shapes the strand to an intermediary configuration aligning it prior to entering the exit die 604.

The slotted, tapered die is typically formed from stainless steel but may be made of any conventional material used in the art. The passageway 616 may contain an insert (not shown) made of a durable material to reduce wear of the die. The insert is typically constructed of tungsten carbide, ceramic, diamond, stainless steel or any conventional material used in the art.

Figure 10:
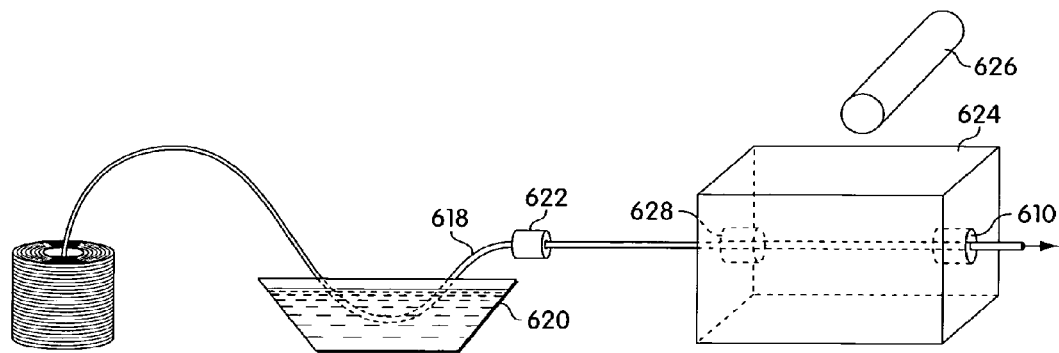
FIG. 10 illustrates an assembly line used for making the low profile flexible reinforcement member using a topcoat die box as the topcoat application device.

FIG. 10 illustrates process for making the reinforcement members using an extruder and die box to apply the topcoat. The coated fibers 618 exit the bath 620 and are introduced to a stripper die 622. The coated fibers 618 are then introduced to topcoat applicator die box 624 containing the topcoat. The topcoat is introduced to die box 624 via extruder 626. The coated fibers 618 enter the die box 624 through slotted, tapered entrance die 628, topcoat is applied and the coated fibers 618 and the fibers 618 exit the die box through tapered, slotted exit die 610. The topcoat is then cooled to form the reinforcement member 308.

Figure 11:
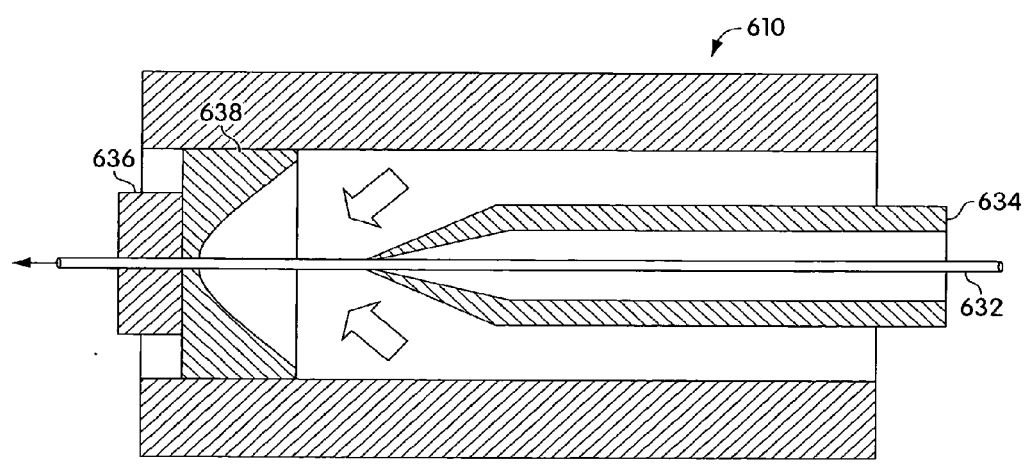
FIG. 11 illustrates a crosshead die used for making the low profile flexible reinforcement according to FIGS. 1-3.

In the alternative and as shown in FIG. 11, a crosshead die 610 may be used to apply topcoat to the coated fibers. Coated fibers 632 are fed into the die 636 through a guide-tip 634. In order to maintain concentricity, the clearance between the coated fibers 632 and the tip 634 is minimal. As the coated fibers 632 are fed through the tip 634, topcoat within the crosshead die 610 is maintained under pressure as it flows around the coated fibers 632 (the flow of the topcoat is designated by arrows). The fibers 632 exit the die box through die 636. The topcoat is then cooled to form the reinforcement member. The function of the tip 634 inside a crosshead die tool is to align the member to be coated. Die 638 (inside the crosshead die 610) serves to bring the coating material uniformly around the coated fibers 632 and gradually narrows in diameter to the final desired dimensions. By changing the relative location of the tip to the die, one can change the force by which the topcoat polymer is applied onto the substrate. Moving the tip further away from the die decreases pressure of the coating material onto the coated fibers. Whereas, moving the tip closer to the die increases pressure of the coating material onto the coated fibers. Other polymers, in addition to those mentioned above, that can be used with a crosshead die include polycarbonate (PC), acrylonitrile-butadiene-styrene terpolymer (ABS), and blends known as PC-ABS.

Various dies and tips may be used with the crosshead dies as known in the art, such as those manufactured by GENCA, A division of PN Tech LLC (Clearwater, Fla.) and Gill Corporation (West Warwick, R.I.). If it is preferable to manufacture a flat product, as described above, flat tips and dies may be used with the crosshead die.

Figure 5:
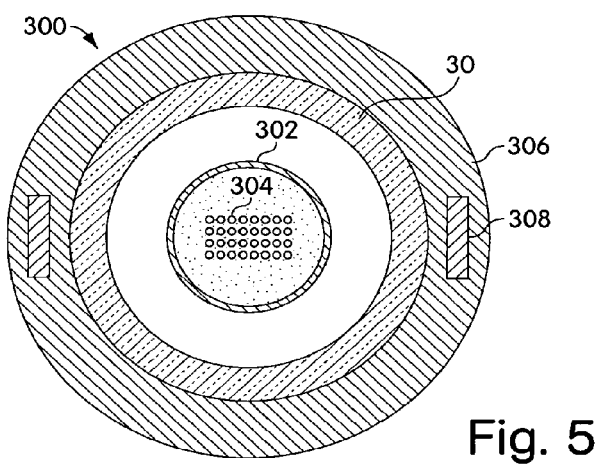
FIGS. 5-6 illustrate communications cables having the low profile flexible reinforcement members of FIGS. 1-3.
Figure 6:
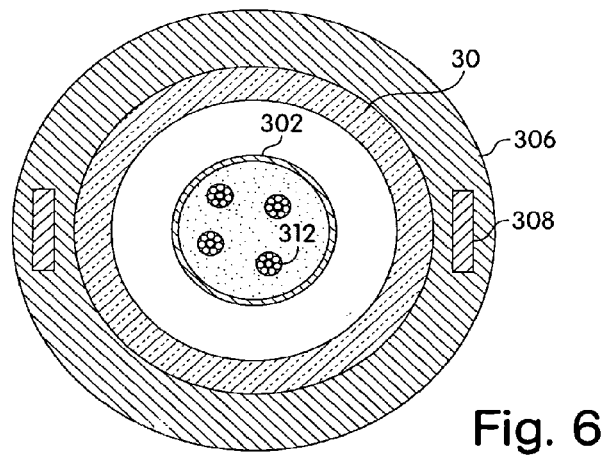

The low profile flexible reinforcement members 308 of FIGS. 1-3 are then available to be inserted into a communications cable by known techniques. FIGS. 5-6 illustrate possible types of communications cables utilizing these low profile flexible reinforcement members 308. Each is described below.

FIGS. 5-6 illustrate a 48-fiber "Dry Cable" structure 300 according to six preferred embodiments of the present invention. Each of these structures 300 having the low profile flexible reinforcement member 308 or 130 offers increased strength and flexibility as compared to structures with traditional reinforcement members.

As shown in FIG. 5, the structure 300 comprises a gel-filled loose tube 302 having an optical fiber ribbon 304. The loose tube 302 is surrounded by the low profile flexible reinforcement member 308 and covered with a high-density polyethylene ("HDPE") sheath 306. Also shown is a strength member 308, which could in this case be made by either the present invention or by conventional thermosetting processes.

In FIG. 6, the optical fiber ribbon 304 is replaced with a plurality of optical fiber bundles 312 contained within the gel filled loose tube 302.

The present invention offers many advantages over the prior art. Because the cable structures 300 having these reinforcement members 308 are lighter than communications cables having traditional glass reinforcement members, installation of these cables within ducts in underground cable systems using known installation techniques such as blowing-in installation is possible, in which compressed air is used to install the cables within underground ducts. As one of skill in the art appreciates, the use of blowing-in installation is a cheaper, less time consuming, and gentler process for installing communication cables versus traditional installation techniques that utilize a winch and gripper to physically pull the cable through and into a duct.

Further, because these structures 300 are more flexible than communication cable structures requiring glass pultruded rods for strength, these structures 300 are more readily inserted around bends or corners in the ducts. Also, because the reinforcement members 308 are stronger and have more rigidity or antibuckling properties than traditional low profile flexible reinforcement members, attenuation of the optical fibers is prevented due cable shrinkage or expansion during daily or seasonal thermal cycling. Bunching or jamming of the communication cables during installation is also prevented due to the ability to engineer the right amount of cable rigidity to prevent these installation problems.

Figure 7:
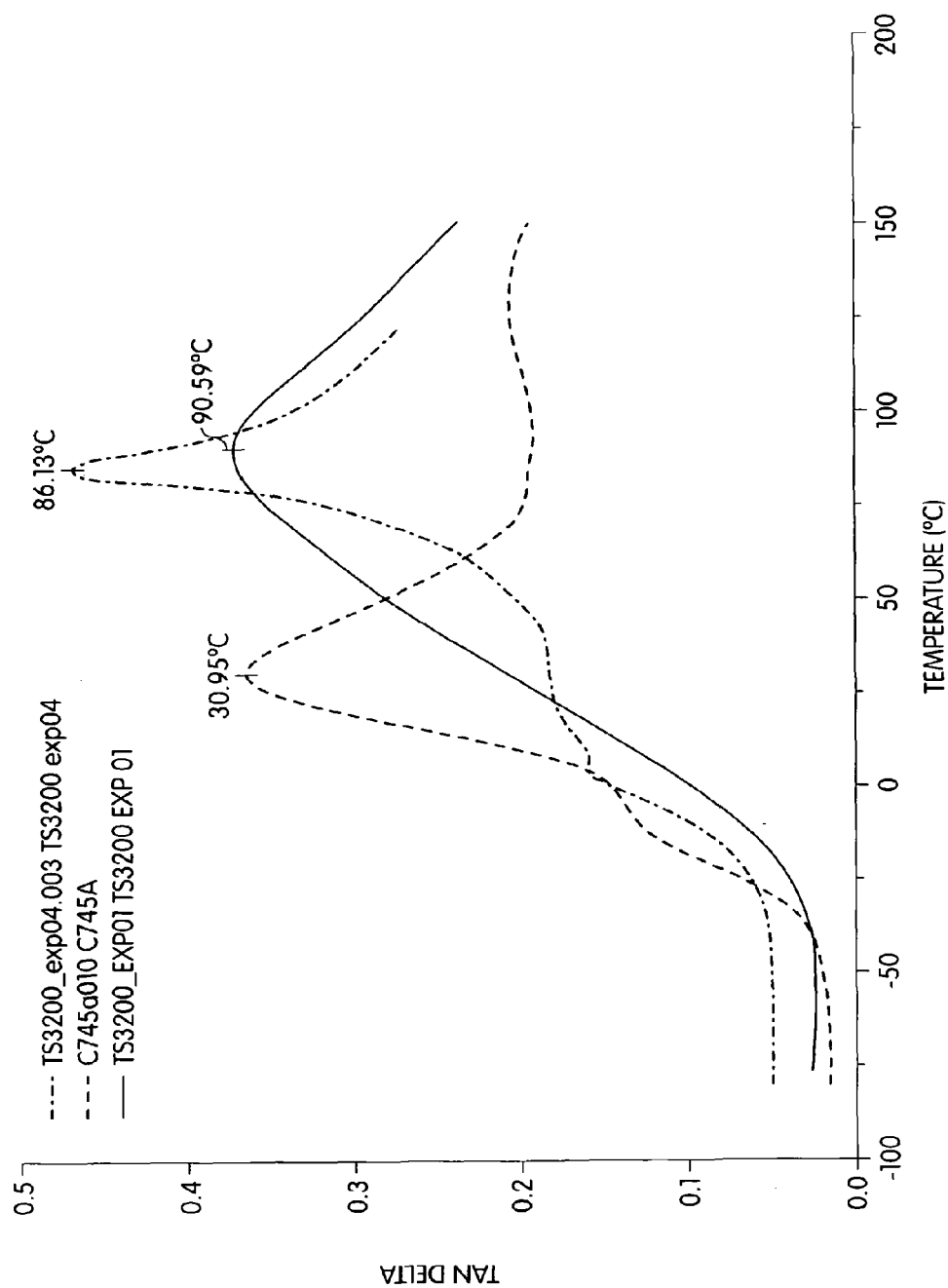
FIG. 7 illustrates a graph comparing glass transition temperatures of traditional coated reinforcements with flexible coated reinforcements of the present invention.

FIG. 7 is a comparative graph depicting glass transition temperatures of traditional coated reinforcements and the flexible coated reinforcements of the present invention. In particular, the glass transition temperature of traditional glass fibers coated with latex and acrylic wax is shown in comparison to glass transition temperatures of glass fibers coated with a low molecular weight mineral wax and an ethylene acrylic acid (EAA) topcoat and glass fibers coated with a low molecular weight mineral wax and ethylene vinyl acetate (EVA) topcoat.

As can be seen in FIG. 7, the standard thermoset CR745A low profile flexible reinforcement has a glass transition temperature, Tg, of 30.96°. Tg is the temperature where an amorphous polymer transitions from a brittle, vitreous material to a more pliable, more flexible, softer material. In contrast to the standard reinforcement, the two thermoplastic-coated reinforcements have Tg's that are about 86° and 91° C., respectively. The higher Tg allows for a processable and more low profile flexible reinforcement at the cable's upper range of the usual operating range of −40° to +80° C.: In contrast the polymer transitions to a stiff matrix at the lower temperature range. Being able to control Tg by selective choice of thermoplastic materials or blends of such materials and appropriate modifiers allows for the reinforcement to be customized to precisely meet the cable's performance requirements. As the reinforcement transitions from a flexible to a rigid member, the cable is protected from shrinkage from the polyethylene or other jacketing material as the cable experiences temperature cycles. Uncontrolled shrinkage can cause optical fiber signal attenuation or catastrophic optical fiber breakage.

While the invention has been described in terms of preferred embodiments, it will be understood, of course, that the invention is not limited thereto since modifications may be made by those skilled in the art, particularly in light of the foregoing teachings.

What is claimed is:

1. A method for forming a low profile flexible reinforcement member cable, the method comprising the steps of:
   a) introducing a low molecular weight primary saturant to a first application device;
   b) melting said low molecular weight primary saturant within said first application device at a temperature sufficient to maintain said low molecular weight primary saturant at a viscosity of less than about 1000 centipoise;
   c) introducing a fiber material to said first application device to coat said low molecular weight primary saturant onto said fiber material to form a coated member;
   d) removing said coated member from said first application device;
   e) introducing said coated member to a first stripper die to remove an excess of said low molecular weight primary saturant from said fiber material;

f) introducing said coated member to a high molecular weight topcoat material contained within a second application device to form a topcoated member;

g) removing said topcoated member from said second application device;

h) introducing said topcoated member to a second stripper die to remove an excess of said high molecular weight topcoat material from said topcoated member; and i) cooling said topcoated member to form the low profile flexible reinforcement member.

2. The method of claim 1 wherein the weight of said low molecular weight primary saturant on said fiber material comprises between 10 and 35 percent of the low profile flexible reinforcement member and wherein the weight of said high molecular topcoat material comprises between approximately 1 and 25 percent of the low profile flexible reinforcement member.

3. The method of claim 1 wherein the primary saturant has a melting point below approximately 300 degrees Celsius.

4. The method of claim 1, wherein said step of introducing said coated member to a high molecular weight topcoat material contained within said second application device includes introducing said coated member to a die box.

5. The method of claim 4, wherein said step of introducing said coated member to a high molecular weight topcoat material contained within second application device includes introducing said coated member to a flat, slotted stripper die located within said die box.

6. The method of claim 1, further comprising the step of introducing said coated member to a flat, slotted entrance die prior to introducing said coated member to a high molecular weight topcoat material.

7. The method of claim 1, wherein introducing a low molecular weight primary saturant to a first application device and introducing said coated member to a high molecular weight topcoated member contained within a second application device comprises:

introducing a low molecular weight primary saturant to first application device, said primary saturant comprising a low molecular weight mineral wax selected from the group consisting of a low molecular weight microcrystalline wax, a low molecular weight polyalphaolefin wax, a low molecular weight polyethylene wax, a low molecular weight polyethylene wax, a low molecular weight maleated polypropylene polymer and blends thereof; and introducing said coated member to a high molecular weight topcoat material contained within second application device to form a topcoated member, said high molecular weight topcoated material selected from the group consisting of a high molecular weight polyethylene topcoat, a high molecular weight polypropylene topcoat, a high molecular weight ethylene acrylic acid topcoat, a high molecular weight polypropylene and polyethylene copolymer topcoat, an ethylene vinyl acetate copolymer topcoat, a styrene-butadiene-styrene topcoat, polyamide topcoat and a polybutadiene terephthlate polyether glycol topcoat and blends thereof.

8. The method of claim 1 wherein the low profile flexible reinforcement member has a cross section defined by an x-axis and a y-axis wherein the length along the x-axis is substantially greater than the length along the y-axis.

9. The method of claim 1, wherein said step of introducing said topcoated member to a second slotted, tapered stripper die includes introducing said topcoated member to a slotted, tapered stripper die comprising a passageway having an entrance and an exit that is tapered on all sides, from the entrance to exit, at a degree from about 4% to about 6%.

10. The method of claim 1 wherein the fiber material comprises a plurality of high modulus fibers.

11. The method of claim 10, wherein said plurality of high modulus fibers comprises a plurality of glass fiber strands.

12. The method of claim 11, wherein said plurality of glass fiber strands comprises at least one glass fiber bundle, each of said at least one glass fiber bundle comprising a plurality of glass fiber filaments.

13. The method of claim 11, wherein said plurality of glass fiber strands comprises a plurality of glass fiber filaments and at least one glass fiber bundle, each of said at least one glass fiber bundle comprising a plurality of glass fiber filaments.

14. The method of claim 11, wherein said plurality of high modulus fibers comprises a plurality of sized high modulus fibers selected from the group consisting of a plurality of sized or unsized aramid fibers and a plurality of sized or unsized poly(p-phenylene-2,6-benzobisoxazole) (PBO) fibers and a plurality of sized or unsized carbon fibers and a plurality of sized or unsized high silica glass and sized or unsized high tenacity, linearized polyethylene fiber.

15. The method of claim 11, wherein said plurality of glass fiber strands comprises a plurality of sized glass fiber strands selected from the group consisting of a plurality of sized or unsized E-type glass fiber strands and a plurality of sized or unsized ECR-type glass fibers.

* * * * *